United States Patent
Wu et al.

(10) Patent No.: US 10,602,402 B1
(45) Date of Patent: Mar. 24, 2020

(54) METHOD AND SYSTEM FOR ADJUSTING PACKET LENGTH AND MOBILE DEVICE USING THE METHOD

(71) Applicant: AMBIT MICROSYSTEMS (SHANGHAI) LTD., Shanghai (CN)

(72) Inventors: Pei-Lun Wu, Taoyuan (TW); Han-Tiet Goh, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

(21) Appl. No.: 16/553,632

(22) Filed: Aug. 28, 2019

(51) Int. Cl.
- *H04W 4/02* (2018.01)
- *H04W 28/06* (2009.01)
- *H04W 28/02* (2009.01)
- *H04W 4/80* (2018.01)
- *G01S 19/51* (2010.01)

(52) U.S. Cl.
CPC ........... *H04W 28/065* (2013.01); *G01S 19/51* (2013.01); *H04W 4/027* (2013.01); *H04W 4/80* (2018.02); *H04W 28/0226* (2013.01)

(58) Field of Classification Search
CPC ......... H04W 4/02; H04W 4/027; H04W 4/80; H04W 28/0226
See application file for complete search history.

(56) References Cited

U.S. PATENT DOCUMENTS

| | | | | |
|---|---|---|---|---|
| 2008/0255758 | A1* | 10/2008 | Graham | G06Q 10/08 701/469 |
| 2014/0274163 | A1* | 9/2014 | Liu | H04W 4/025 455/456.6 |
| 2018/0367947 | A1* | 12/2018 | Kim | H04W 4/02 |

OTHER PUBLICATIONS

The Indoor Positioning System Using Fingerprint Method Based Deep Neural Network: Malik, R. F.;Gustifa, R.;Farissi, A.;Stiawan, D.;Ubaya, H.;Ahmad, M. R.;Khirbeet, A. S. IOP Conference Series: Earth and Environmental Science 248: 012077 (12 .). (Year: 2019).*

* cited by examiner

*Primary Examiner* — Jinsong Hu
*Assistant Examiner* — Farideh Madani
(74) *Attorney, Agent, or Firm* — ScienBiziP, P.C.

(57) ABSTRACT

A method for adjusting packet length is disclosed. A first dynamic reference point currently closest to the mobile device is calculated. A current position of a mobile device is compared with GPS data of the first dynamic reference point to calculate brief GPS data. It is determined whether a second dynamic reference point has been uploaded to the server. It is determined whether the first dynamic reference point is identical to the second dynamic reference point if the second dynamic reference point has been uploaded to the server. The first dynamic reference point is uploaded to the server if the first dynamic reference point is not identical to the second dynamic reference point. The first dynamic reference point is uploaded to the server if the second dynamic reference point has not been uploaded to the server, and the brief GPS data is uploaded to the server.

12 Claims, 6 Drawing Sheets

METHOD AND SYSTEM FOR ADJUSTING PACKET LENGTH AND MOBILE DEVICE USING THE METHOD

BACKGROUND

1. Technical Field

The disclosure relates to packet processing techniques, and more particularly to a method and system for adjusting packet length and a mobile device using the method.

2. Description of Related Art

Internet of Things (IoT) front-end products transmit packets via Long Range (LoRa) technology, which is a long range, low power wireless platform that has become the de facto technology for IoT networks worldwide. The LoRa technology has the following characteristics: even if the packet length is very slightly increased, the packet loss rate is significantly raised since the probability of packet collisions with other devices is increased. When the collision is detected, the packets may be lost or become incomplete that may become problematic to users in long-term user. Furthermore, overlong packet lengths and frequently uploading packets may result in the sharply raised packet loss rate. In addition, most IoT front-end products are powered by batteries of low capacities without re-charging capability, hence, frequently replacing batteries are required.

DETAILED DESCRIPTION

Figure 1:
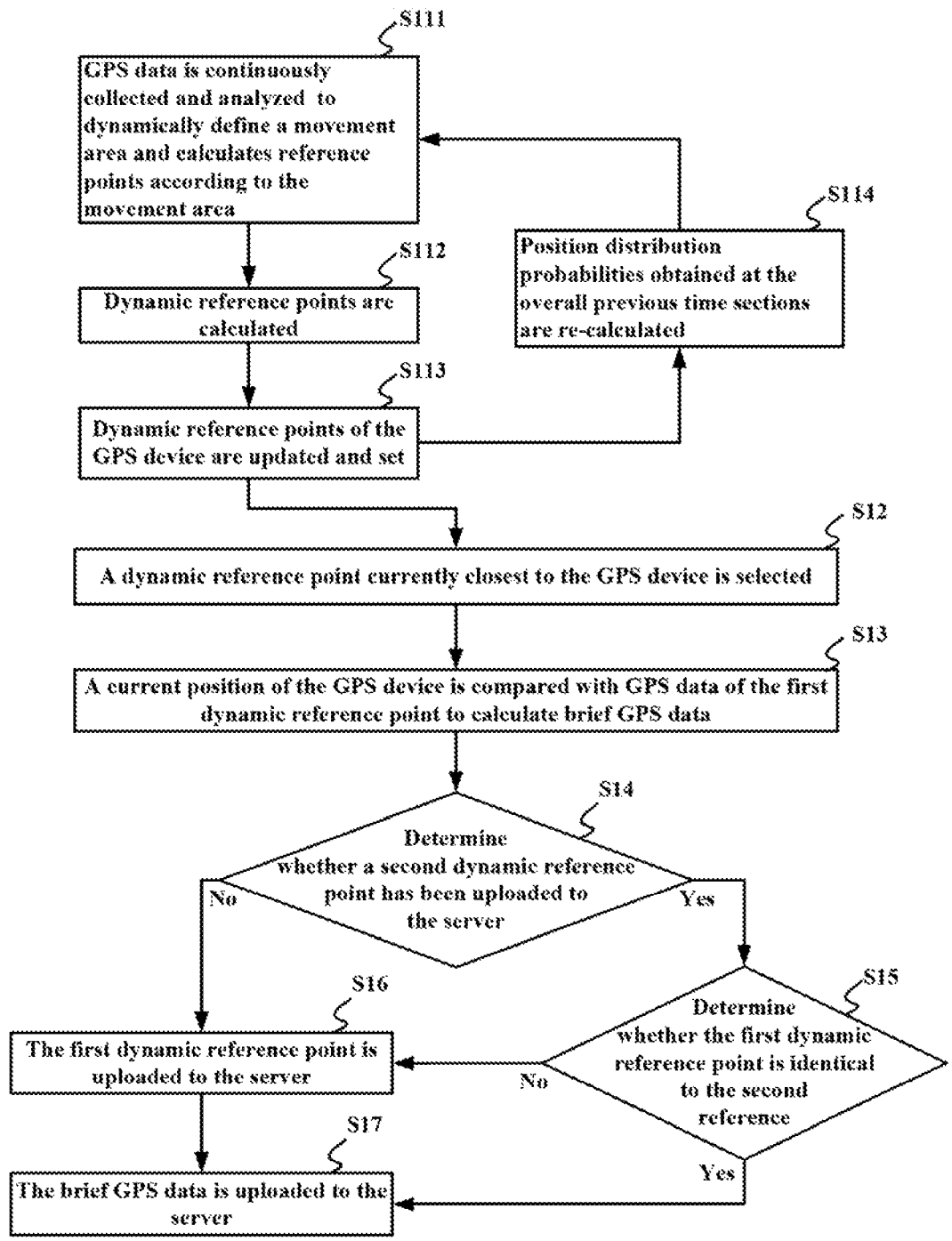
FIG. 1 is a flowchart of an embodiment of a method for adjusting packet length of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

A global positioning system (GPS) packet is the packet with the longest length in a positioning system. Considering the packet loss rate and the power consumption of the positioning system, reducing the packet length is a top priority. Since cars, mobile devices or objects needed to be positioned usually move at a specific area, an embodiment of a method for adjusting packet length of the present disclosure divides the specific area into multiple sections and defines GPS reference points according to the sections. The GPS reference points and a selecting algorithm choosing the reference points are stored in a GPS device.

FIG. 1 is a flowchart of an embodiment of a method for adjusting packet length of the present disclosure.

In Step S111, the server continuously collects GPS data uploaded by the GPS device compatible with the LoRa protocol and analyzes the GPS data to dynamically define a movement area of the GPS device so that the longitude and the latitude of the movement area are obtained. The longitude of the movement area is represented as $(Lon_L, Lon_H)$ while the latitude thereof is represented as $(Lat_L, Lat_H)$. Multiple reference points are defined according to the movement area of the GPS device and are written in the GPS device and the server connecting to the GPS device, as shown in FIG. 2.

Further, the movement area is divided into multiple sections and N reference points are defined according to the sections. The position of the n-th reference point is calculated using the formula (1), represented as:

$$\begin{cases} Lon_n = (n-1)(Lon_H - Lon_L)/\sqrt{N} \\ Lon_n = (n-1)(Lat_H - Lat_L)/\sqrt{N} \end{cases} \quad (1)$$

Figure 2:
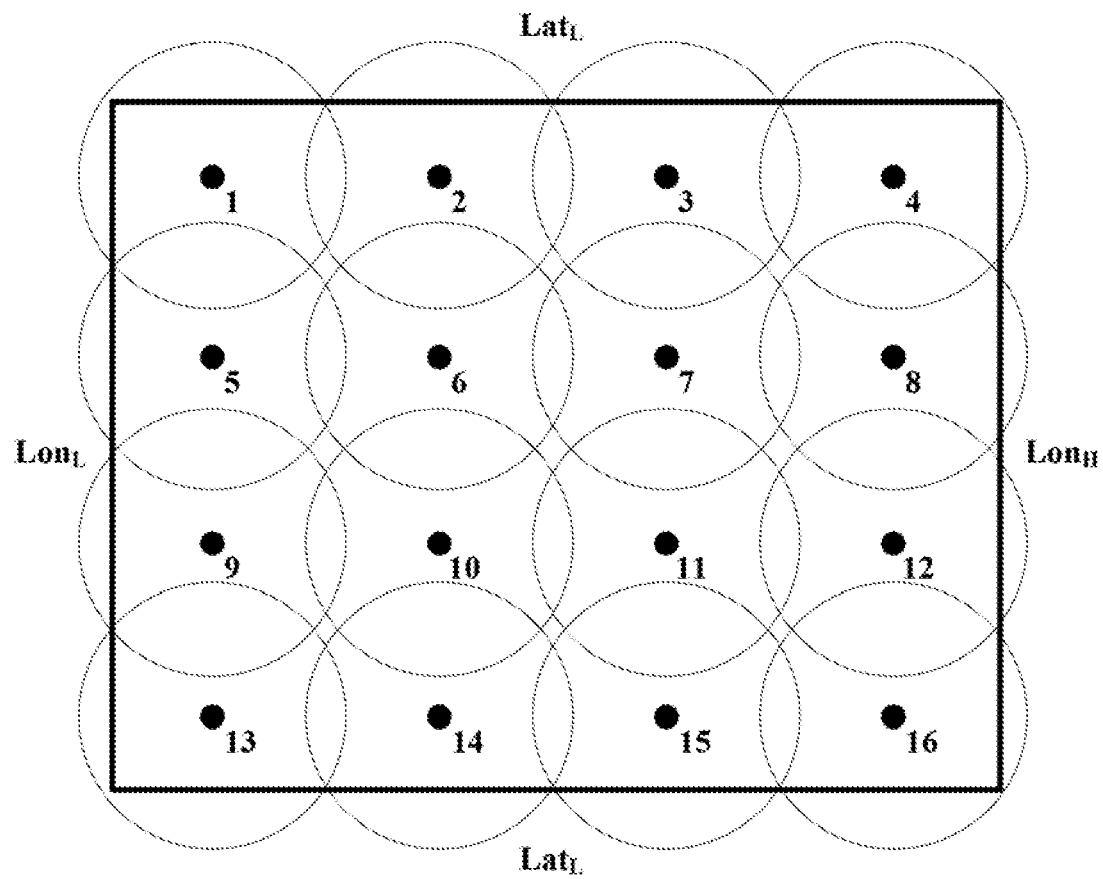
FIG. 2 is a schematic diagram of an embodiment of defining reference points of the present disclosure.

Referring to FIG. 2, for example, the overall reference points are defined using the formula (1) to get 16 reference points (N=16).

In Step S112, the GPS data uploaded by the GPS device is analyzed by the server to obtain position distribution probabilities (DP) of each of the reference points, and selects reference points with the distribution probabilities greater than P ($S \in \{nDP \geq P\}$) as dynamic reference points.

Figure 3:
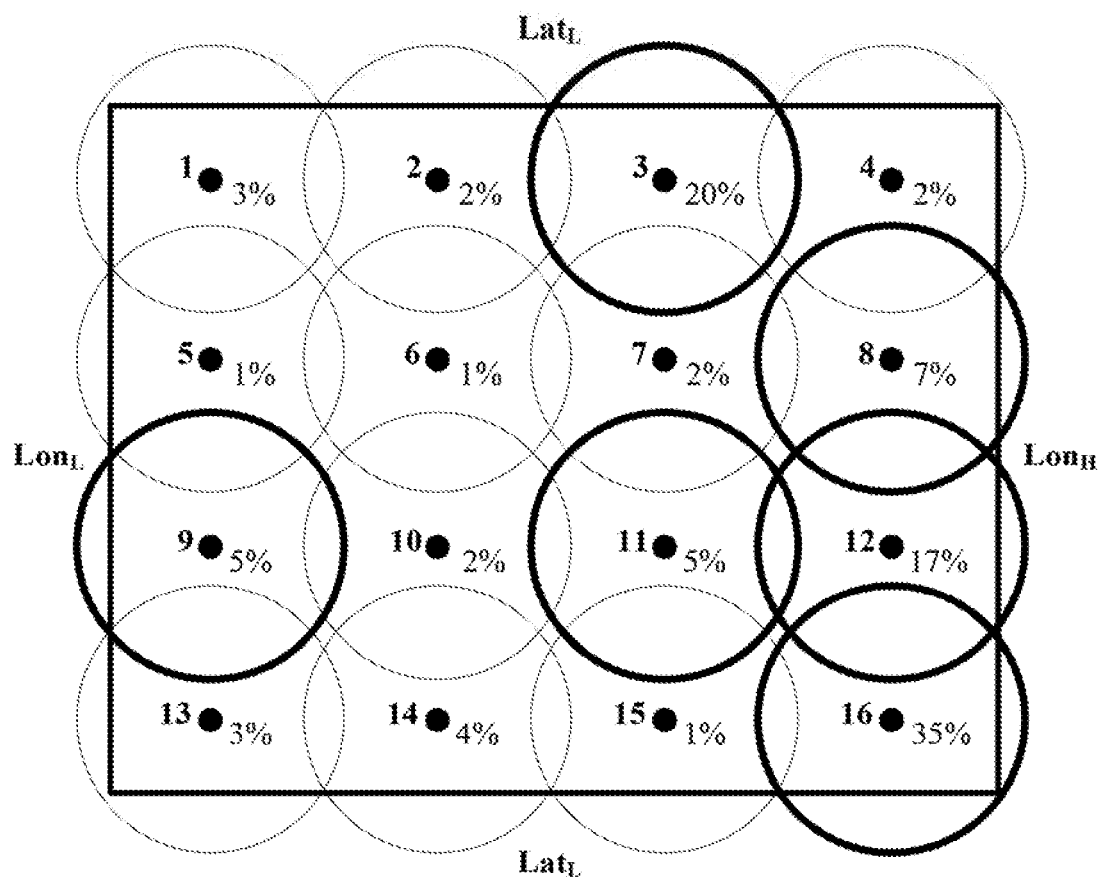
FIG. 3 is a schematic diagram of an embodiment of calculating dynamic reference points of the present disclosure.

In an embodiment, the P is defined as 5%. The movement area of the GPS device is shown in FIG. 2. The server collects and analyzes position distribution probabilities of the reference points of the GPS device and selects and treats the reference points 3, 8, 9, 11, 12 and 16 as the dynamic reference points, as shown in FIG. 3.

In Step S113, the server updates and sets, via a LoRa downloading transmission method, the dynamic reference points of the GPS device.

In Step S114, as a period of time passed, when the server collects another W pieces of GPS data, the previous GPS data is re-checked that reference weights for the reference points are decreased. At the time point T, position distribution probabilities obtained at the overall previous time sections are re-calculated using the formula (2), as shown in the following:

$$S \in \left\{ \sum_{t=0}^{T} \left(\frac{M_I}{T}\right) n_{DP} \geq P \right\}. \quad (2)$$

As the GPS device continuously moves, the dynamical reference points are capable of statistical features that raises the reliability.

In Step S12, a dynamic reference point is going to be selected, using a selecting algorithm, and stored in the GPS device and the server connecting to the GPS device via a network. When the GPS device is activated, a dynamic reference point, for example, a first dynamic reference, nearest to the GPS device is calculated and selected using the formulas (3) and (4), represented as:

$$n = \min_{1 \leq n \leq N} (|Lon_d - Lon_n|2 + |Lat_d - Lat_n|2), \text{ and} \quad (3)$$

$$\begin{cases} Lon_n = n(Lon_H - Lon_L)/\sqrt{N} \\ Lon_n = n(Lat_H - Lat_L)/\sqrt{N} \end{cases}. \quad (4)$$

Referring to FIG. 3, for example, when the GPS device is located at the movement area, the GPS position thereof is substituted into the formulas (3) and (4) to obtain the 16-th dynamic reference point (n=16). The GPS device transmits the selected dynamic reference point and its current position to the server.

In step S13, a current position of the GPS device is compared with GPS data of the first dynamic reference point to calculate brief GPS data.

In step S14, it is determined whether a second dynamic reference point has been uploaded to the server.

In step S15, it is determined whether the first dynamic reference point is identical to the second dynamic reference point if the second dynamic reference point has been uploaded to the server.

In step S16, the first dynamic reference point with 1 byte length is uploaded to the server using a LoRa uploading transmission method if the first dynamic reference point is not identical to the second dynamic reference point.

In step S14, the first dynamic reference point is uploaded to the server if the second dynamic reference point has not been uploaded to the server.

In step S17, the brief GPS data is uploaded to the server using the LoRa uploading transmission method.

In step S16, the first dynamic reference point to the server is not uploaded if the first dynamic reference point is identical to the second dynamic reference point, and only the brief GPS data is uploaded to the server using the LoRa uploading transmission method.

The server confirms the current dynamic reference point of the mobile device using a downloading instruction.

The dynamic reference point previously uploaded is selected, if the mobile device is located near multiple dynamic reference points of the plurality of dynamic reference points with the same distance or a saved packet length for the calculated brief GPS data of each of the multiple dynamic reference points is identical to each other.

In step S17, original GPS data is uploaded to the server if the GPS device moves cross the movement area.

The GPS device applicable to the LoRa technology calculates displacement from the beginning time of entering the first dynamic reference point to the current time to estimate the next position of the GPS device, estimates the next position of the second dynamic reference point, and, when the second dynamic reference point is not identical to the first dynamic reference point, notifies the server to update the current dynamic reference point by the second dynamic reference point.

The following describes an embodiment of the technical effect of the brief GPS data.

Referring to FIG. 2, position addresses of the GPS device moving within the movement area are transformed using a NMEA (National Marine Electronics Association)-to-LoRa transformation formula to generate GPS data with the LoRa format, as shown in Table 1.

TABLE 1

|   | Lat   | Lon   |
|---|-------|-------|
| H | 2C26F3 | 56324B |
| L | 2C1B0E | 563D07 |

In the movement area, as shown in Table 1, the addresses the longitude and the latitude comprise the same addresses "2C" and "56", respectively using 1 byte, so that the addresses "2C" and "56" can be ignored. Thus, the GPS data saves at least 2 bytes, as shown in Table 2.

TABLE 2

| | Message Type | Longitude | Latitude | Total Length |
|---|---|---|---|---|
| Original Method | 1 bytes | 3 bytes | 3 bytes | 7 bytes |
| Propose Method | 1 bytes | 2 bytes | 2 bytes | 5 bytes |

The following describes another embodiment of the technical effect of the brief GPS data.

Figure 4:
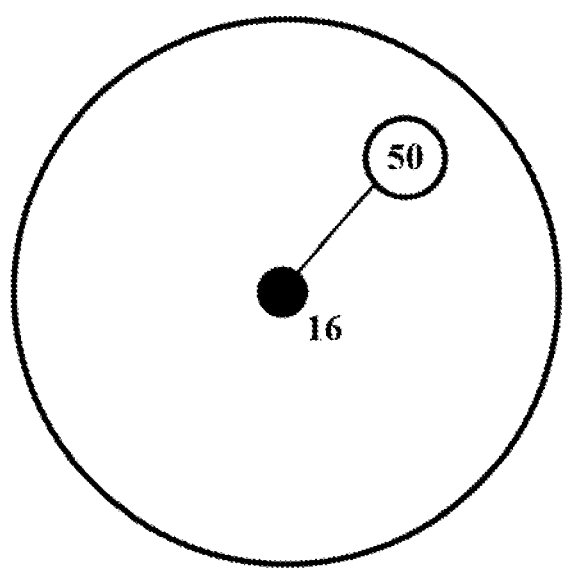
FIG. 4 is a schematic diagram of an embodiment of saving packet lengths of the present disclosure.

Referring to FIG. 4 comprising the reference point 16 and the GPS device 50, position addresses of the GPS device moving within the movement area and the dynamic reference point 16 are transformed using the NMEA-to-LoRa transformation formula to generate GPS data with the LoRa format, as shown in Table 3

TABLE 3

|   | Lat | Lon |
|---|-----|-----|
| Reference Point | 2C1C51 | 563C7F |
| DUT Location | 2C1CE0 | 563CBA |

The GPS device 50 is quite close to reference point 16. In the movement area, as shown in Table 3, the addresses the longitude and the latitude comprise the same addresses "2C1C" and "563C", respectively using 2 byte, so that the addresses "2C1C" and "563C" can be ignored. Thus, the GPS data saves at least 4 bytes, as shown in Table 4.

TABLE 4

| | Message Type | Longitude | Latitude | Total Length |
|---|---|---|---|---|
| Original Method | 1 bytes | 3 bytes | 3 bytes | 7 bytes |
| Propose Method | 1 bytes | 1 bytes | 1 bytes | 3 bytes |

Figure 5:
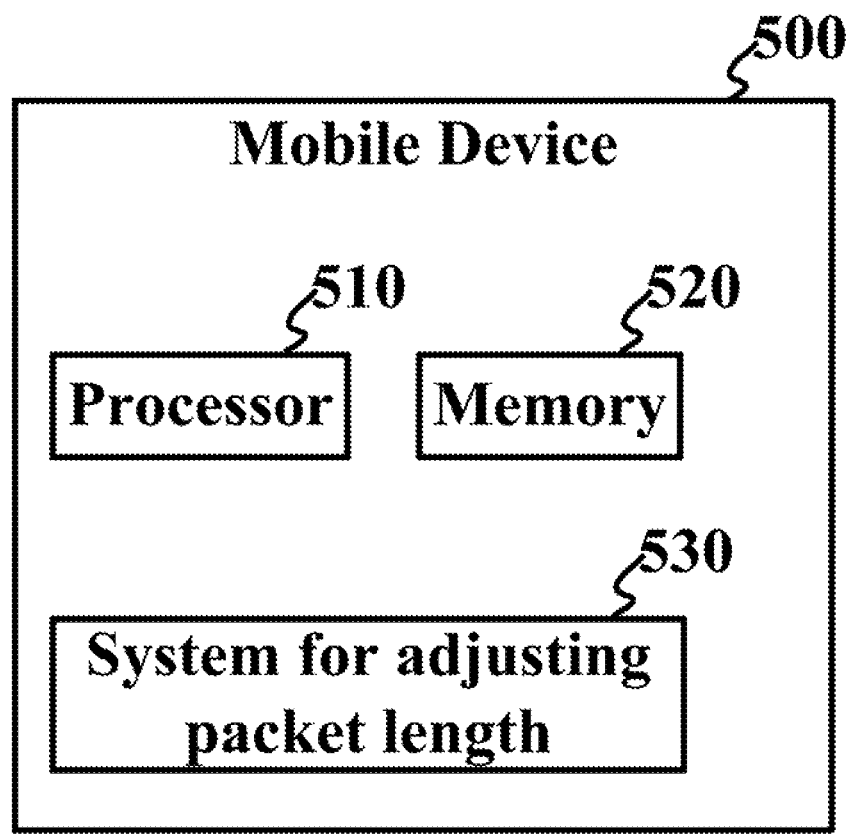
FIG. 5 is a schematic diagram of an embodiment of the hardware architecture of a mobile device of the present disclosure.

FIG. 5 is a schematic diagram of an embodiment of the hardware architecture of a mobile device of the present disclosure. The mobile device 500 may, but is not limited to, connect to a processor 510, a memory 520 and a system for adjusting packet length 530 via system buses. The mobile device 500 shown in FIG. 5 may include more or less components than those illustrated, or may combine certain components.

The memory 520 stores a computer program, such as the system for adjusting packet length 530, which is executable by the processor 510. When the processor 510 executes the system for adjusting packet length 530, the blocks in one embodiment of the method for adjusting packet length applied in the mobile device 500 are implemented, such as blocks S41 to S42 shown in FIG. 4.

It will be understood by those skilled in the art that FIG. 5 is merely an example of the mobile device 500 and does not constitute a limitation to the mobile device 500. The mobile device 500 may include more or less components than those illustrated, or may combine certain components. The mobile device 500 may also include input and output devices, network access devices, buses, and the like.

The processor 510 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 510 may be a microprocessor or other processor known in the art.

The memory 520 can be used to store the system for adjusting packet length 530 and/or modules/units by running or executing computer programs and/or modules/units stored in the memory 520. The memory 520 may include a storage program area and a storage data area. In addition, the memory 520 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The system for adjusting packet length 530 can be partitioned into one or more modules/units that are stored in the memory 520 and executed by the processor 510. The one or more modules/units may be a series of computer program instructions capable of performing particular functions of the system for adjusting packet length 530.

Figure 6:
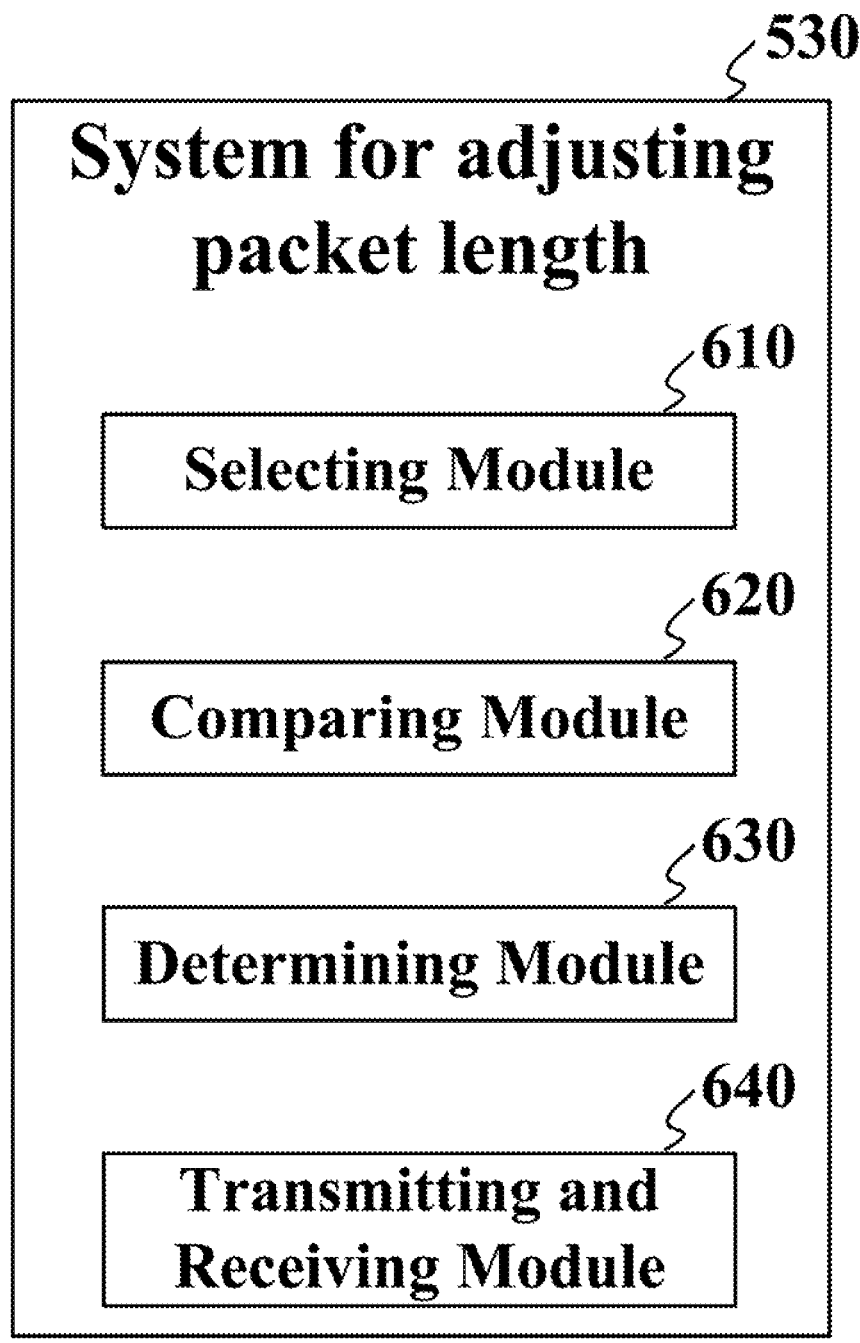
FIG. 6 is a schematic diagram of an embodiment of functional blocks of a system for adjusting packet length of the present disclosure.

FIG. 6 is a schematic diagram of an embodiment of functional blocks of a system for adjusting packet length of the present disclosure.

The mobile devices 500 comprises a selecting module 610, a comparing module 620, a determining module 630 and a transmitting and receiving module 640.

The transmitting and receiving module 640 uploads GPS data of the GPS device, compatible with the LoRa protocol, and reference points to a server (not shown). The server continuously collects GPS data uploaded by the GPS device and analyzes the GPS data to dynamically define a movement area of the GPS device so that the longitude and the latitude of the movement area are obtained. The longitude of the movement area is represented as $(Lon_L, Lon_H)$ while the latitude thereof is represented as $(Lat_L, Lat_H)$. Multiple reference points are defined according to the movement area of the GPS device and are written in the GPS device and the server connecting to the GPS device, as shown in FIG. 2.

Further, the movement area is divided into multiple sections and N reference points are defined according to the sections. The position of the n-th reference point is calculated using the formula (1), represented as:

$$\begin{cases} Lon_n = (n-1)(Lon_H - Lon_L)/\sqrt{N} \\ Lon_n = (n-1)(Lat_H - Lat_L)/\sqrt{N} \end{cases} \quad (1)$$

Referring to FIG. 2, for example, the overall reference points are defined using the formula (1) to get 16 reference points (N=16).

Further, the transmitting and receiving module 640 receives the dynamic reference point information from the server and updates the information to the GPS device.

The server collects and analyzes multiple pieces of GPS data of the GPS device to obtain position distribution probabilities (DP) of each of the reference points, and selects reference points with the distribution probabilities greater than P $(S \in \{nDP \geq P\})$.

In an embodiment, the P is defined as 5%. The movement area of the GPS device is shown in FIG. 2. The server collects and analyzes position distribution probabilities of the reference points of the GPS device and selects and treats the reference points 3, 8, 9, 11, 12 and 16 as dynamic reference points, as shown in FIG. 3. The server updates and sets, via the LoRa downloading transmission method, the dynamic reference points of the GPS device.

As a period of time passed, when the server collects another W pieces of GPS data, the previous GPS data is re-checked that reference weights for the reference points are decreased. At the time point T, position distribution probabilities obtained at the overall previous time sections are re-calculated using the formula (2), as shown in the following:

$$S \in \left\{ \sum_{t=0}^{T} \left(\frac{M_t}{T}\right) n_{DP} \geq P \right\}. \quad (2)$$

As the GPS device continuously moves, the dynamical reference points are capable of statistical features that raises the reliability.

When the mobile device 500 is activated, the selecting module 610 calculates, from the multiple dynamic reference points, a first dynamic reference point currently closest to the mobile device 500 using the formulas (3) and (4), represented as:

$$n = \min_{1 \leq n \leq N} (|Lon_d - Lon_n|2 + |Lat_d - Lat_n|2), \text{ and} \quad (3)$$

-continued $$\begin{cases} Lon_n = n(Lon_H - Lon_L)/\sqrt{N} \\ Lon_n = n(Lat_H - Lat_L)/\sqrt{N} \end{cases}. \quad (4)$$

Referring to FIG. 3, for example, when the GPS device is located at the movement area, the GPS position thereof is substituted into the formulas (3) and (4) to obtain the 16-th dynamic reference point (n=16). The GPS device transmits the selected dynamic reference point and its current position to the server.

The comparing module 620 compares a current position of the mobile device 500 with GPS data of the first dynamic reference point to calculate brief GPS data.

The determining module 630 determines whether a second dynamic reference point has been uploaded to the server, and determines whether the first dynamic reference point is identical to the second dynamic reference point if the second dynamic reference point has been uploaded to the server. The transmitting and receiving module 640 uploads the first dynamic reference point with 1byte length to the server using the LoRa uploading transmission method if the first dynamic reference point is not identical to the dynamic second reference point, and uploads the first dynamic reference point to the server if the second dynamic reference point has not been uploaded to the server.

The transmitting and receiving module 640 then uploads the brief GPS data to the server using the LoRa uploading transmission method.

The transmitting module and receiving 640 does not upload the first dynamic reference point to the server if the first dynamic reference point is identical to the second dynamic reference point, and only uploads the brief GPS data to the server using the LoRa uploading transmission method.

The transmitting module and receiving 640 uploads the dynamic reference point previously selected, if the mobile device is located near multiple dynamic reference points of the plurality of dynamic reference points with the same distance or a saved packet length for the calculated brief GPS data of each of the multiple dynamic reference points is identical to each other.

The transmitting module and receiving 640 uploads original GPS data to the server if the mobile device 500 moves cross the movement area.

The Mobile device 500 applicable to the LoRa technology calculates displacement from the beginning time of entering the first dynamic reference point to the current time to estimate the next position of the GPS device, estimates the next position of the second dynamic reference point, and, when the second dynamic reference point is not identical to the first dynamic reference point, notifies the server to update the current dynamic reference point by the dynamic second reference point.

An embodiment of the method for adjusting packet length enables the packet loss rate to be reduced from 2.2% to 0%. The method for adjusting packet length can also be applied to a LoRa GPS packet with a greater packet length, such as more than 7 bytes, to substantially decrease the packet loss rate of the positioning system and improve system performance.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for adjusting packet length, executable by a mobile device, wherein the mobile connects to a server via a network, the method comprising: continuously collecting, by the server, Global Positioning System (GPS) data uploaded by the mobile device and analyzing the GPS data to dynamically define a movement area of the mobile device, and calculating multiple reference points of the movement area; analyzing, by the server, the GPS data to obtain position distribution probabilities (DP) of each of the reference points, and selecting, from the multiple reference points, reference points with the position distribution probabilities greater than a preset threshold value as dynamic reference points; updating and setting, by the server, the dynamic reference points of the mobile device; calculating a first dynamic reference point currently closest to the mobile device; comparing a current position of the mobile device with GPS data of the first dynamic reference point to calculate brief GPS data; determining whether a second dynamic reference point has been uploaded to the server; determining whether the first dynamic reference point is identical to the second dynamic reference point when the second reference point has been uploaded to the server; uploading the first dynamic reference point to the server when the first dynamic reference point is not identical to the second dynamic reference point; uploading the first dynamic reference point to the server when the second dynamic reference point has not been uploaded to the server; uploading the brief GPS data to the server; and uploading original GPS data to the server when the mobile device moves out of the movement area.

2. The method for adjusting packet length of claim 1, further comprising: not uploading the first dynamic reference point to the server if the first dynamic reference point is identical to the second dynamic reference point; and uploading the first dynamic reference point and the brief GPS data to the server via a Long Range (LoRa) uploading transmission method if the first dynamic reference point is not identical to the second dynamic reference point.

3. The method for adjusting packet length of claim 1, further comprising:
   the server confirming the current dynamic reference point of the mobile device using a downloading instruction.

4. The method for adjusting packet length of claim 1, further comprising:
   selecting the dynamic reference point previously uploaded, if the mobile device is located near at an approximately equal distance from multiple dynamic reference points of the plurality of dynamic reference points or a saved packet length for the calculated brief GPS data of each of the multiple dynamic reference points is identical to each other.

5. A system for adjusting packet length, executable by a mobile device, wherein the mobile comprises a plurality of reference points defined according to a movement area thereof and connects to a server via a network, the method comprising: a transmitting and receiving module, configure to upload Global Positioning System (GPS) data of the mobile device to the server, wherein the analyzes the GPS data to dynamically define a movement area of the mobile device, calculates multiple reference points of the movement area, analyzes the GPS data to calculate position distribution probabilities (DP) of each of the reference points, selects, from the multiple reference points, reference points with the position distribution probabilities greater than a preset threshold value as dynamic reference points, updates and sets the dynamic reference points of the mobile device; a selecting module, configured to calculate a first dynamic reference point currently closest to the mobile device; a comparing module, configured to compare a current position of the mobile device with GPS data of the first dynamic reference point to calculate brief GPS data; a determining module, configure to determine whether a second dynamic reference point has been uploaded to the server, and determine whether the first dynamic reference point is identical to the second dynamic reference point when the second dynamic reference point has been uploaded to the server; a transmitting and receiving module, configure to upload the first dynamic reference point to the server when the first dynamic reference point is not identical to the second dynamic reference point, upload the first dynamic reference point to the server when the second dynamic reference point has not been uploaded to the server, and upload the brief GPS data to the server, wherein the transmitting module uploads original GPS data to the server when the mobile device moves out of the movement area.

6. The system for adjusting packet length of claim 5, wherein the transmitting module does not upload the first dynamic reference point to the server if the first dynamic reference point is identical to the second dynamic reference point, and uploads the first dynamic reference point and the brief GPS data to the server using a Long Range (LoRa) uploading transmission method if the first dynamic reference point is not identical to the second dynamic reference point.

7. The system for adjusting packet length of claim 5, wherein the server confirms the current reference point of the mobile device using a downloading instruction.

8. The system for adjusting packet length of claim 5, wherein the selecting module selects the dynamic reference point previously uploaded, if the mobile device is located near at an approximately equal distance from multiple dynamic reference points of the plurality of dynamic reference points or a saved packet length for the calculated brief GPS data of each of the multiple dynamic reference points is identical to each other.

9. A mobile device, comprising: at least one processor; a storage device; and one or more programs that are stored in the storage and executed by the at least one processor, the one or more programs comprising instructions for: continuously collecting, by the server, Global Positioning System (GPS) data uploaded by the mobile device and analyzing the GPS data to dynamically define a movement area of the mobile device, and calculating multiple reference points of the movement area; analyzing, by the server, the GPS data to obtain position distribution probabilities (DP) of each of the reference points, and selecting, from the multiple reference points, reference points with the position distribution probabilities greater than a preset threshold value as dynamic reference points; updating and setting, by the server, the dynamic reference points of the mobile device; calculating a first dynamic reference point currently closest to the mobile device; comparing a current position of the mobile device with GPS data of the first dynamic reference point to calculate brief GPS data; determining whether a second dynamic reference point has been uploaded to the server; determining whether the first dynamic reference point is identical to the second dynamic reference point when the second dynamic reference point has been uploaded to the server; uploading the first dynamic reference point to the server when the first dynamic reference point is not identical to the second dynamic reference point; uploading the first dynamic reference point to the server when the second dynamic reference point has not been uploaded to the server; uploading the brief GPS data to the server; and uploading original GPS data to the server when the mobile device moves out of the movement area.

10. The mobile device of claim 9, wherein the one or more programs further comprises: not uploading the first dynamic reference point to the server if the first dynamic reference point is identical to the second dynamic reference point; and uploading the first dynamic reference point and the brief GPS data to the server via a Long Range (LoRa) uploading transmission method if the first dynamic reference point is not identical to the second dynamic reference point.

11. The mobile device of claim 9, wherein the one or more programs further comprises:
 the server confirming the current dynamic reference point of the mobile device using a downloading instruction.

12. The mobile device of claim 9, wherein the one or more programs further comprises:
 selecting the reference dynamic point previously uploaded, if the mobile device is located near at an approximately equal distance from multiple dynamic reference points of the plurality of dynamic reference points or a saved packet length for the calculated brief GPS data of each of the multiple dynamic reference points is identical to each other.

\* \* \* \* \*